US008289808B2

(12) United States Patent
Vu et al.

(10) Patent No.: US 8,289,808 B2
(45) Date of Patent: Oct. 16, 2012

(54) SYSTEM AND METHOD TO ESTIMATE COMPRESSIONAL TO SHEAR VELOCITY (VP/VS) RATIO IN A REGION REMOTE FROM A BOREHOLE

(75) Inventors: Cung Vu, Houston, TX (US); Kurt T. Nihei, Oakland, CA (US); Denis P. Schmitt, Dhahran (SA); Christopher Skelt, Houston, TX (US); Paul A. Johnson, Santa Fe, NM (US); Robert Guyer, Reno, NV (US); James A. TenCate, Los Alamos, NM (US); Pierre-Yves Le Bas, Los Alamos, NM (US)

(73) Assignees: Chevron U.S.A., Inc.; Los Alamos National Security

( * ) Notice: Subject to any disclaimer, the term of this patent is extended or adjusted under 35 U.S.C. 154(b) by 482 days.

(21) Appl. No.: 12/463,796

(22) Filed: May 11, 2009

(65) Prior Publication Data

US 2010/0265794 A1 Oct. 21, 2010

Related U.S. Application Data

(60) Provisional application No. 61/170,070, filed on Apr. 16, 2009.

(51) Int. Cl.
*G01V 1/00* (2006.01)

(52) U.S. Cl. ............................................. 367/31; 367/35

(58) Field of Classification Search ..................... 367/35, 367/124–126
See application file for complete search history.

(56) References Cited

U.S. PATENT DOCUMENTS 3,302,745 A 2/1967 Ikrath
(Continued)

FOREIGN PATENT DOCUMENTS

EP 1122558 A 8/2001
(Continued)

OTHER PUBLICATIONS

International Search Report and Written Opinion for PCT International Patent Application No. PCT/US2010/031485, mailed on Aug. 2, 2010.

(Continued)

*Primary Examiner* — Isam Alsomiri
*Assistant Examiner* — Krystine Breier
(74) *Attorney, Agent, or Firm* — Pillsbury Winthrop Shaw Pittman LLP

(57) ABSTRACT

In some aspects of the disclosure, a method for creating three-dimensional images of non-linear properties and the compressional to shear velocity ratio in a region remote from a borehole using a conveyed logging tool is disclosed. In some aspects, the method includes arranging a first source in the borehole and generating a steered beam of elastic energy at a first frequency; arranging a second source in the borehole and generating a steerable beam of elastic energy at a second frequency, such that the steerable beam at the first frequency and the steerable beam at the second frequency intercept at a location away from the borehole; receiving at the borehole by a sensor a third elastic wave, created by a three wave mixing process, with a frequency equal to a difference between the first and second frequencies and a direction of propagation towards the borehole; determining a location of a three wave mixing region based on the arrangement of the first and second sources and on properties of the third wave signal; and creating three-dimensional images of the non-linear properties using data recorded by repeating the generating, receiving and determining at a plurality of azimuths, inclinations and longitudinal locations within the borehole. The method is additionally used to generate three dimensional images of the ratio of compressional to shear acoustic velocity of the same volume surrounding the borehole.

18 Claims, 7 Drawing Sheets

U.S. PATENT DOCUMENTS

| | | | |
|---|---|---|---|
| 3,732,945 | A | 5/1973 | Lavigne |
| 3,872,421 | A | 3/1975 | Rogers et al. |
| 3,974,476 | A | 8/1976 | Cowles |
| 4,253,166 | A | 2/1981 | Johnson |
| 4,382,290 | A | 5/1983 | Havira |
| 4,509,149 | A | 4/1985 | Ruehle |
| 4,646,565 | A | 3/1987 | Siegfried |
| 4,757,873 | A | 7/1988 | Linyaev et al. |
| 4,805,873 | A | 2/1989 | Mouton |
| 5,144,590 | A | 9/1992 | Chon |
| 5,521,882 | A * | 5/1996 | D'Angelo et al. ............... 367/32 |
| 5,719,823 | A | 2/1998 | Earp |
| 6,009,043 | A | 12/1999 | Chon et al. |
| 6,175,536 | B1 | 1/2001 | Khan ............................... 367/32 |
| 6,216,540 | B1 | 4/2001 | Nelson et al. |
| 6,440,075 | B1 | 8/2002 | Averkiou |
| 6,597,632 | B2 | 7/2003 | Khan |
| 6,631,783 | B2 * | 10/2003 | Khan ............................ 181/108 |
| 6,704,247 | B1 | 3/2004 | Ruffa |
| 6,937,938 | B2 * | 8/2005 | Sansone .......................... 702/16 |
| 7,059,404 | B2 * | 6/2006 | Flecker et al. ............ 166/250.02 |
| 7,301,852 | B2 * | 11/2007 | Leggett et al. ................... 367/32 |
| 7,310,580 | B2 * | 12/2007 | Zhou et al. ......................... 702/6 |
| 7,463,551 | B2 | 12/2008 | Leggett, III et al. |
| 8,116,167 | B2 | 2/2012 | Johnson et al. |
| 2005/0036403 | A1 | 2/2005 | Leggett, III et al. |
| 2010/0002540 | A1 | 1/2010 | Vu et al. |

FOREIGN PATENT DOCUMENTS

| | | |
|---|---|---|
| GB | 2168568 | 6/1986 |
| GB | 2404983 A | 2/2005 |
| SU | 913303 | 3/1982 |
| WO | 02/04985 A2 | 1/2002 |
| WO | 2007/030016 A1 | 3/2007 |
| WO | 2008/094050 A2 | 8/2008 |

OTHER PUBLICATIONS

International Search Report and Written Opinion for PCT International Patent Application No. PCT/US2010/031490, mailed on Sep. 14, 2010.

Aas et al., 3-D Acoustic Scanner, SPE, Society of Petroleum Engineers, Sep. 23-26, 1990, pp. 725-732.

Johnson, Paul A., and Shankland, Thomas J., "Nonlinear Generation of Elastic Waves in Crystalline Rock", Journal of Geophysical Research, vol. 92, No. B5, 1987, pp. 3597-3602.

Ostrovsky. L.A., and Johnson, P.A., "Dynamic Nonlinear Elasticity in Geomaterials", Rivista del Nuovo Cimento, vol. 24, No. 7., 2001.

Johnson, Paul A., and Shankland, Thomas J., "Nonlinear Generation of Elastic Waves in Granite and Sandstone: Continuous Wave and Travel Time Observations", Journal of Geophysical Research, vol. 94, No. B12, 1989, pp. 17,729-17,733.

Jones, G.L. and Kobett, D.R., "Interaction of Elastic Waves in an Isotropic Solid", The Journal of the Acoustical Society of America, vol. 35, No. 1, 1963, pp. 5-10.

Rollins, F.R., Taylor, L.H. and Todd, P.H., "Ultrasonic Study of Three-Phonon Interactions. II. Experimental Results", Physical Review, vol. 136, No. 3A, 1964, pp. 597-601.

Korneev, Valeri A., Nihei, Kurt T. and Myer, Larry R., "Nonlinear Interaction of Plane Elastic Waves", Lawrence Berkeley National Laboratory Report LBNL-41914, 1998.

International Preliminary Report on Patentability for PCT International Patent Application No. PCT/US2010/031490, mailed on Oct. 27, 2011.

International Preliminary Report on Patentability for PCT International Patent Application No. PCT/US2010/031485, mailed on Oct. 27, 2011.

Peter J. Westervelt; "Parametric Acoustic Array", The Journal of the Acoustical Society of America, vol. 35, No. 4, Apr. 1963, pp. 535-537.

International Search Report and Written Opinion for PCT International Patent Application No. PCT/US2009/047934, mailed Jan. 12, 2009.

International Search Report and Written Opinion for PCT International Patent Application No. PCT/US2009/047184, mailed Dec. 21, 2009.

International Preliminary Report on Patentability for PCT International Patent Application No. PCT/US2009/047184, mailed Dec. 23, 2010.

Tserkovnyak et al.; "Non-linear tube waves in permeable formations: Difference frequency generation", Journal of the Acoustical Society of America, Jul. 1, 2004, vol. 116, Issue 1, pp. 209-216.

Singapore Office Action for Appln. No. 201009640-2, mailed Dec. 2, 2011.

PCT International Search Report and Written Opinion for PCT International Patent Application No. PCT/US2011/035608, mailed Dec. 22, 2011.

PCT International Search Report and Written Opinion for PCT International Patent Application No. PCT/US2011/035595, mailed Dec. 27, 2011.

PCT International Search Report and Written Opinion for PCT International Patent Application No. PCT/US2011/035358, mailed Dec. 29, 2011.

International Preliminary Report on Patentability for PCT International Patent Application No. PCT/US2009/047934, mailed Jan. 13, 2011.

International Preliminary Report on Patentability for PCT International Patent Application No. PCT/US2009/047184, mailed Dec. 14, 2010.

International Preliminary Report on Patentability for PCT International Patent Application No. PCT/US2009/047934, mailed Dec. 1, 2009.

* cited by examiner

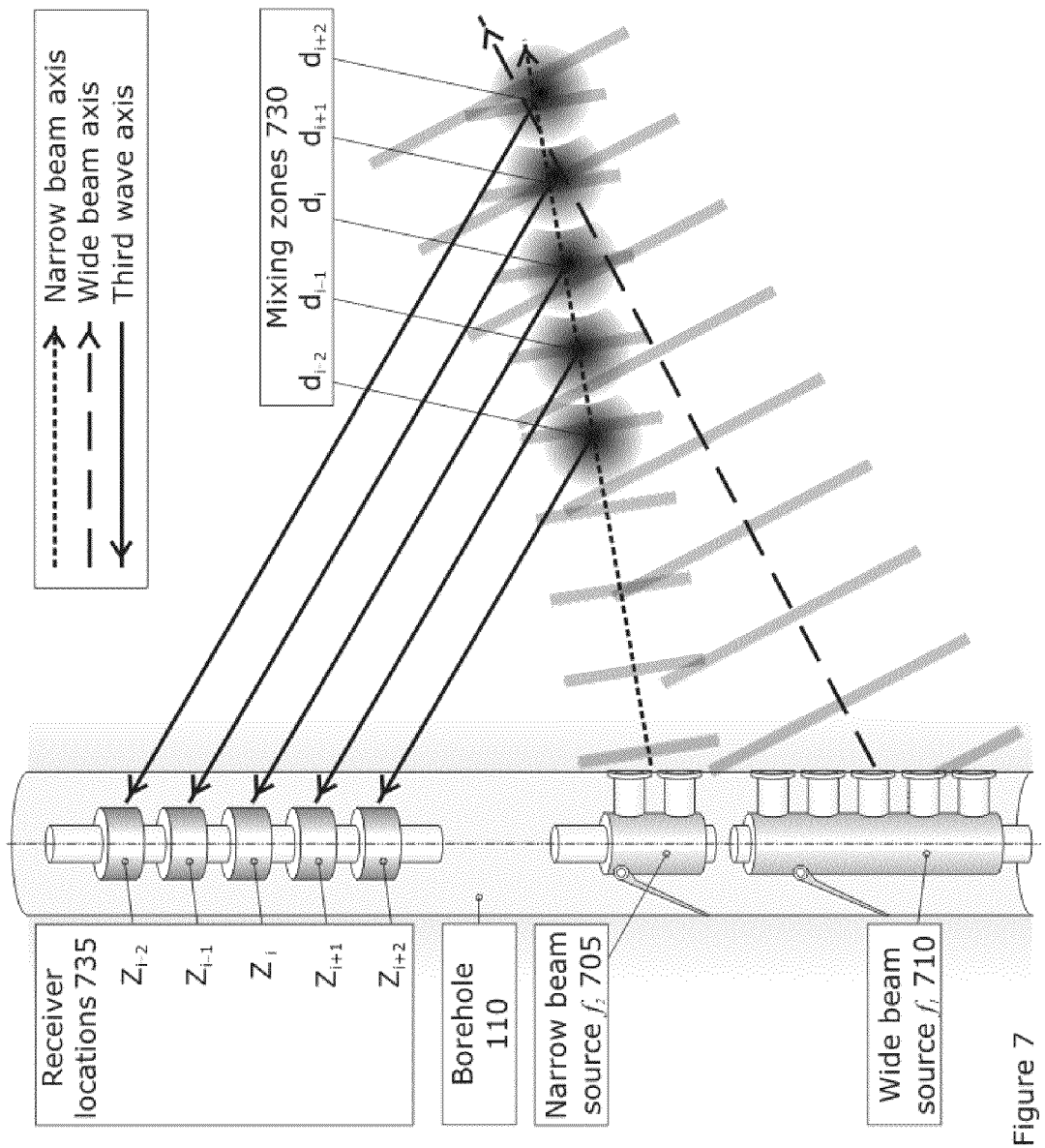

SYSTEM AND METHOD TO ESTIMATE COMPRESSIONAL TO SHEAR VELOCITY (VP/VS) RATIO IN A REGION REMOTE FROM A BOREHOLE

CROSS-REFERENCE TO RELATED APPLICATIONS

This application claims benefit from U.S. Provisional Application No. 61/170,070 filed on Apr. 16, 2009, incorporated herein by reference in its entirety, under 35 U.S.C. §119(e).

GOVERNMENT RIGHTS

This invention was made with Government support under Cooperative Research and Development Agreement (CRADA) Contract Number DE-AC52-06NA25396 awarded by the United States Department of Energy. The Government may have certain rights in this invention.

FIELD

The present invention relates generally to seismic interrogation of rock formations and more particularly to creating three-dimensional images of non-linear properties and the compressional to shear velocity ratio in a region remote from a borehole using a combination of sources in a borehole configured to provide elastic energy, and receiving and analyzing a resultant third wave formed by a three wave mixing process.

BACKGROUND

Acoustic interrogation of subsurface features tends to be limited by the size and power of practical sources, and in practice, the output of down hole acoustic transducers is limited by the power transmission capabilities of the wireline cable. High frequency signals have a relatively short penetration distance, while low frequency signals generally require large sources, clamped to the borehole wall, to maximize energy transfer to the formation and minimize unwanted signals within the well bore. Currently, acoustic borehole tools are designed with acoustic sources in the borehole to detect returning acoustic waves that are propagating along the borehole walls or scattered by inhomogeneities of linear properties of rock formations surrounding the borehole. U.S. Pat. No. 7,301,852 by Leggett, III et al. discloses a Logging While Drilling tool, designed to detect rock formation boundaries, with two acoustic source arrays emitting from a borehole generating a third wave by assumed non-linear mixing in rocks at the location of intersection of the acoustic signals. The third wave is scattered by heterogeneities in subsurface properties, and the scattered signal is detected by sensors in the logging tool. The source arrays are merely disclosed to be directional without any further description.

Attempts have been made to characterize the non-linear properties of a formation in the area of oil and gas prospecting from boreholes, but each has its own limitations. For example, U.S. Pat. No. 5,521,882 by D'Angelo et al. discloses an acoustic tool designed to record with pressure receivers the non-linear waves that propagate along the borehole wall with limited penetration into the surrounding rock formation and refract back into the well bore fluid. U.S. Pat. No. 6,175,536 by Khan discloses a method to estimate the degree of non-linearity of earth formations from spectral analysis of seismic signals transmitted into the formation from one borehole and received in a second borehole. In light of these prior attempts, there is a need for an apparatus and method for generating three-dimensional images of non-linear properties in a remote region from a borehole.

SUMMARY

In accordance with some aspects of the disclosure, a method for creating three-dimensional images of non-linear properties in a region remote from a borehole using a conveyed logging tool is disclosed. The method includes arranging with a specific spatial configuration a first source in the borehole and generating a steerable primary beam of elastic energy at a first frequency; arranging a second source in the borehole and generating a steerable primary beam of elastic energy at a second frequency, such that the two steerable beams intercept at a location away from the borehole; receiving by an array of sensors at the borehole the arrival of the third elastic wave, created by a three wave mixing process in the rock formation, with a frequency equal to a difference between the first and second primary frequencies, that propagates back to the borehole in a specific direction; locating the three wave mixing region based on the arrangement of the first and second sources and on the properties of the third wave signal; and creating three-dimensional images of the non-linear properties using data recorded by repeating the generating, receiving and locating steps at a plurality of azimuths, inclinations and longitudinal locations within the borehole.

In accordance with some aspects of the disclosure, a method for creating three-dimensional images of non-linear properties in a region remote from a borehole using a conveyed logging tool is disclosed. The method includes arranging with a specific spatial configuration a first source in the borehole and generating a primary wave of elastic energy at a first frequency; arranging a second source in the borehole and generating a primary wave of elastic energy at a second frequency; receiving by an array of three component sensors at the borehole the arrival of the third elastic wave created by a three wave mixing process, with a frequency equal to a difference between the first and second primary frequencies, that propagates back to the borehole; determining the propagation direction of the third wave from the signals received by the sensor array; imaging the locus of the three wave mixing region based on the arrangement of the first and second sources and the propagation direction of the third wave; and creating three-dimensional images of the non-linear properties using data recorded by repeating the generating, receiving, determining and imaging steps at a plurality of azimuths, inclinations and longitudinal locations within the borehole.

In accordance with some aspects of the disclosure, further methods for creating three-dimensional images of non-linear properties in a region remote from a borehole using a conveyed logging tool are disclosed. These share the common configuration of two sources and an array of sensors in the borehole, but differ in that the one or other of the sources may generate a steerable beam or a wave of elastic energy, and the sensor units in the array may be a combination of non-directional and three component devices. The method includes arranging with a specific spatial configuration a first source in the borehole and generating either a steerable primary beam of elastic energy or a primary wave of elastic energy at a first frequency; arranging a second source in the borehole and generating either a steerable primary beam of elastic energy or a primary wave of elastic energy at a second frequency, such that the energy from the two sources mixes at locations away from the borehole; receiving by a sensor array at the borehole the direct arrival of the third elastic wave, created by a three wave mixing process, with a frequency equal to a difference between the first and second primary frequencies, that propagates back to the borehole in a specific direction; locating the three wave mixing region based on the arrangement of the first and second sources and on properties of the third wave signal; and creating three-dimensional images of the non-linear properties using data recorded by repeating the generating, receiving and locating steps at a plurality of azimuths, inclinations and longitudinal locations within the borehole.

In accordance with some aspects of the disclosure, three dimensional images of the non-linear properties of the formations surrounding the borehole are transformed to reservoir properties using appropriate relations between formation non-linearity and said properties. The images may be of properties at the time of logging, or may represent changes between two logging runs separated by the passage of time.

In accordance with some aspects of the disclosure, methods to create three dimensional images of the ratio of compressional to shear acoustic velocity of rocks surrounding the borehole are disclosed. These methods are variations of the methods for creating three dimensional images of non-linear properties discussed above.

In accordance, with some aspects of the disclosure, an apparatus for creating three-dimensional images of non-linear properties and the compressional to shear velocity ratio of the rock formations remote from a borehole using a conveyed logging tool is disclosed. The apparatus includes a first source arranged in the borehole and configured to generate a steerable beam or a wave of elastic energy at a first frequency; a second source arranged in the borehole and configured to generate a steerable beam or a wave of elastic energy at a second frequency, such that the beams or waves at the first frequency and the second frequency intercept at a location away from the borehole; and a non-directional or three component sensor array configured to receive a third elastic wave if that the non-linear properties of the region of interest result in the creation of the third elastic wave by a three wave mixing process having a frequency equal to a difference of the first and the second frequencies and a specific direction of propagation back to the borehole; a first processor arranged in the borehole to control source firing and recording of the third elastic wave; a device configured to transmit data up-hole through a wireline cable for a wireline tool; and a second processor arranged to create the three-dimensional images based, in part, on properties of the received third wave and the arrangement of the first and second sources.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 7 shows an application of aspects of the disclosure for imaging using a beam and broad beam or plane wave.

DETAILED DESCRIPTION

Figure 1:
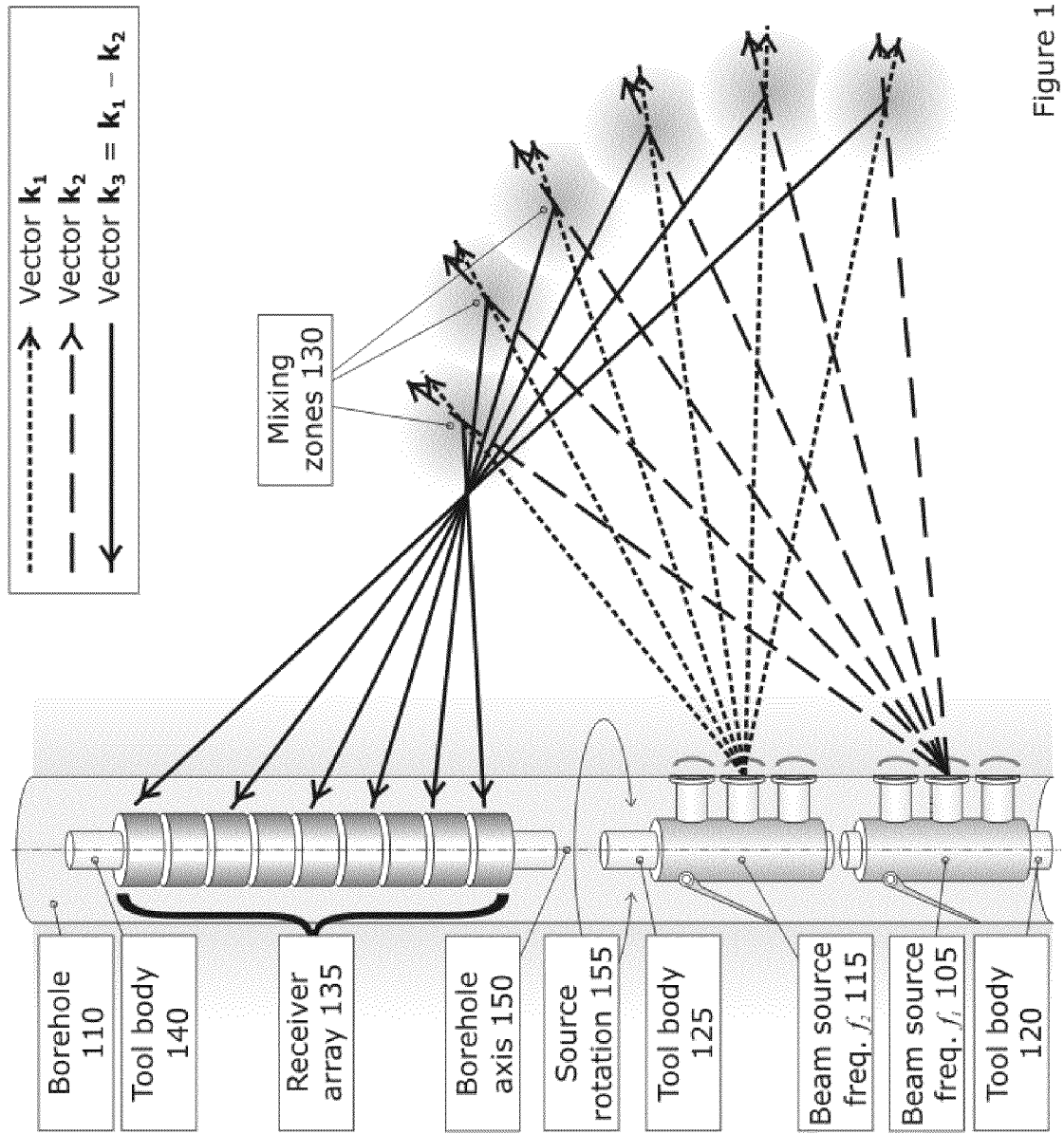
FIG. 1 shows a configuration for creating three-dimensional images of non-linear properties in a region remote from a borehole in accordance with various aspects of the disclosure

FIG. 1 shows one of several possible configurations for creating three-dimensional images of non-linear properties and the compressional to shear velocity ratio in a region remote from a borehole in accordance with various aspects of the disclosure. First source 105 is arranged in borehole 110 to generate a steerable primary beam of acoustic energy at a first frequency $f_1$. Second source 115 is also arranged in borehole 110 to generate a steerable primary beam of acoustic energy at a second frequency $f_2$. By way of a non-limiting example, both first source 105 and second source 115 may be a phased array of sources and may be configured to generate either compressional or shear steerable beams.

As shown in FIG. 1, first source 105 is arranged on first tool body 120 and second source 115 is arranged on second tool body 125. However, the disclosure is not so limiting as first tool body 120 and second tool body 125 may also be arranged together on a common tool body (not shown). Tool bodies 120 and 125 are arranged to be independently moveable within bore hole 110 in at least two degrees of freedom including translation along the longitudinal axis 150 of borehole 110 and rotation 155 in azimuth about the longitudinal axis of borehole 110. First source 105 may be arranged above or below second source 115 in borehole 110. Tool bodies 120 and 125 may be arranged on a conveyed logging tool (not shown) within borehole 110.

For a given azimuth orientation of first source 105 and second source 115, the beam generated by second source 115 and the beam generated by first source 105 are configured such that the beams converge and intercept in a mixing zones 130 remote from borehole 110. By a combination of independently steering the beams and changing the separation between the sources 105, 115, the mixing zones 130 move in the plane defined by the beams and the longitudinal borehole axis 150, while controlling the angle of interception. The distance of mixing zones 130 from borehole 110 can range from near the edge of borehole 110 to about 300 meters into the surrounding subsurface rock formation. By way of a non-limiting example, the phase difference and/or time delays between adjacent elements in the source array may be modified to focus the acoustic energy of the primary beams at a particular mixing zone.

The non-linear properties of the earth at the location between the two waves result in the generation of a third elastic wave. The third elastic wave is a result of a three-wave mixing process that occurs in nonlinear materials, in this case, rock formations. In this process, two converging non-collinear waves of different frequencies, $f_1$ and $f_2$, also called primary waves, mix to form additional waves at the harmonic and intermodulation frequencies $f_1-f_2$, $f_1+f_2$, $2\times f_1$; and $2\times f_2$, etc. The strength of the third wave is a function the non-linearity of the rocks in the mixing zones. By way of a non-limiting example, when a primary compressional (P) wave with a frequency $f_1$ and a primary shear (SV) wave with a frequency $f_2$ cross in a non-linear medium, a third compressional (P) or shear (SV) wave is generated with a frequency $f_1-f_2$. For further description, see Johnson et al. (1987) and Johnson and Shankland (1989), which is hereby incorporated by reference in its entirety.

As further discussed below under propagation selection rules, the third wave propagation vector is co-planar with the propagation vectors of the two primary waves. Certain combinations of angle of intersection, $f_1/f_2$ ratio and compressional to shear velocity ratio result in a third elastic wave with frequency $f_1-f_2$ propagating in a specific angle relative to the primary beams back to the borehole 110.

Sensor or receiver array 135 is arranged at specific location in borehole 110 to detect the third wave returning to the borehole 110. In some aspects of the disclosure, as shown in the Figure, sensor array 135 comprises more than one sensor arranged as an array of sensors on sensor tool body 140 and separate from tool bodies 120 and 125. Sensor 135 is configured to be independently moveable within bore hole 110 along the longitudinal axis 150 of borehole 110. In some aspects, sensor tool body 140 is arranged below tool bodies 120 and 125 or arranged above and below tool bodies 120 and 125. In some aspects, sensor tool body 140 is connected to either or both tool bodies 120 and 125.

Figure 2:
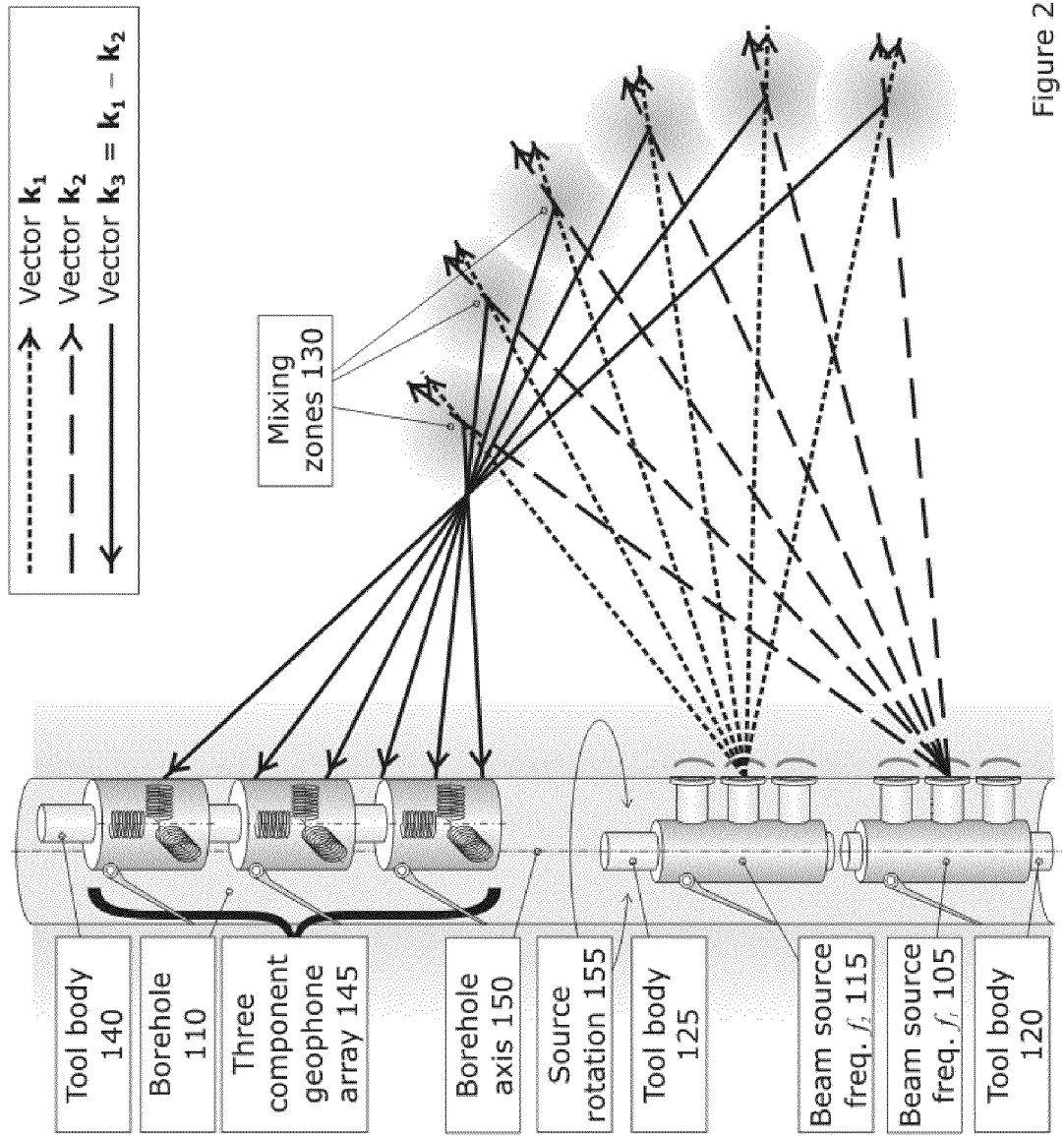
FIG. 2 shows a configuration for creating three-dimensional images of non-linear properties in a region remote from a borehole in accordance with aspects of the disclosure.

The third wave is detected at borehole 110 by sensor array 135. FIG. 2 shows an arrangement similar to FIG. 1, wherein receiver 135 is replaced by three component geophone 145 clamped to the borehole walls. The resultant signal is decomposed by processing into its inclination and azimuth in order to add redundancy to the system by determining the direction of the incoming third wave arrival.

In some aspects, a first processor configured to execute machine-readable instructions (not shown) may be arranged in borehole 110 to perform various processing tasks, such as controlling source firing and compressing or filtering the data recorded by sensor array 135. A second processor configured to execute machine-readable instructions (not shown) may be arranged outside borehole 110 to assist the first processor or perform different processing tasks than the first processor. For example, the second processor may perform part or all processing activities in creating the three-dimensional images. A transmitter or transceiver (not shown) may be arranged in borehole 110 to transmit data up-hole through a wireline cable (not shown).

At a given depth along the borehole of one of the sources 105, 115, sweeping the beams in inclination at constant relative bearing to spatially scan the mixing zone in a plane passing through the borehole axis, rotating the sources azimuthally to rotationally scan the mixing region and moving the whole assembly along borehole 110, results in scanning a 3D volume of mixing zones around the borehole for non-linear properties. With sources 105, 115 and sensor array 135 located on independent tool bodies, high redundancy in the data can be obtained and the depth of investigation can be varied. In this way, a 3D volume of the rocks surrounding the borehole can be interrogated for non-linear properties and a 3D image of non-linear properties can be processed and computed from the returned signals.

Figure 3:
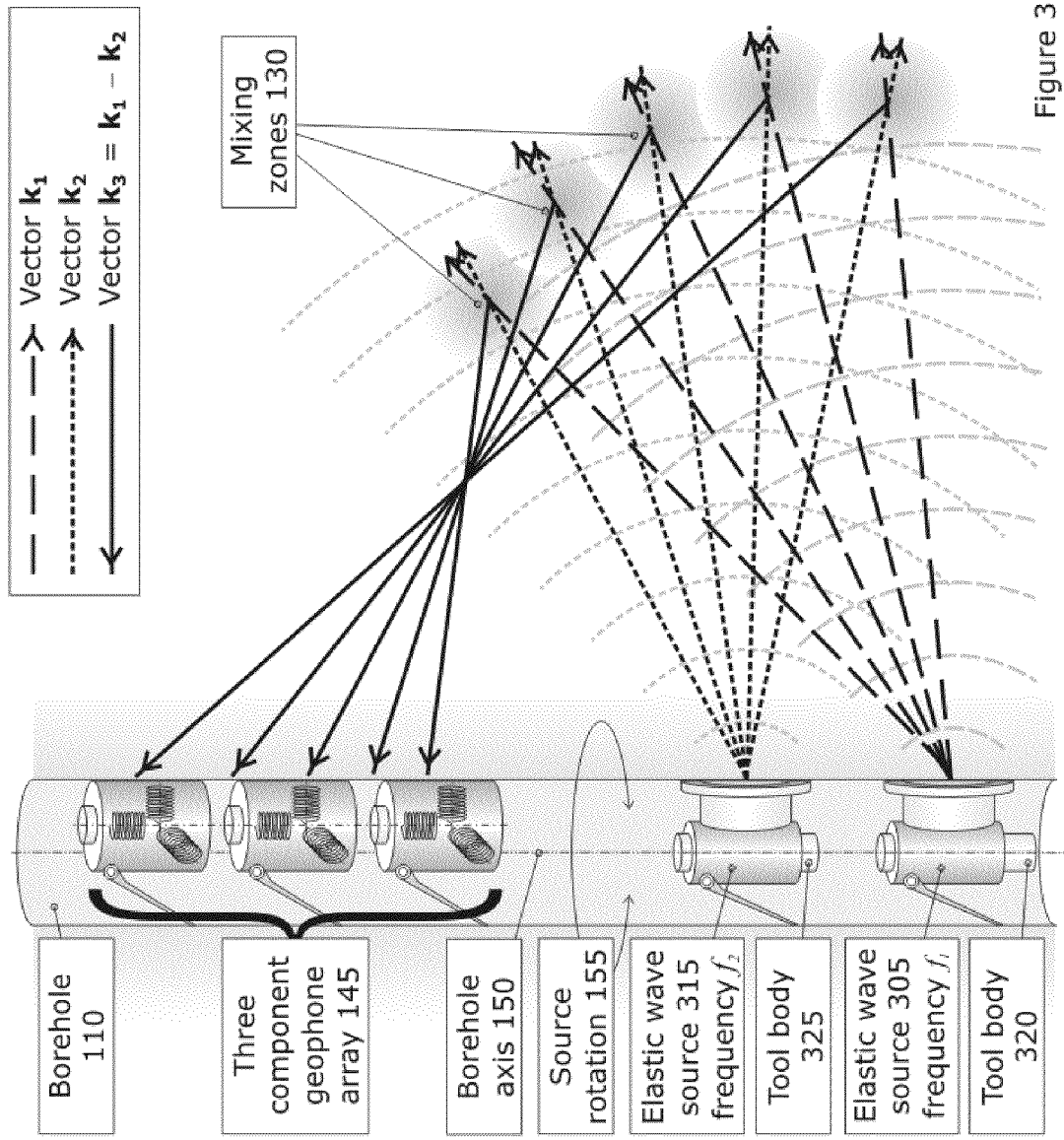
FIG. 3 shows a configuration for creating three-dimensional images of non-linear properties in a region remote from a borehole in accordance with aspects of the disclosure.

FIG. 3 shows another arrangement for creating three-dimensional images of non-linear properties in a region remote from a borehole in accordance with various aspects of the disclosure. The arrangement of FIG. 3 is similar to the arrangement in FIG. 2, with the primary difference being that the sources are arranged in borehole 110 to produce elastic waves instead of steerable beams. With reference to FIG. 3, first source 305 is arranged in borehole 110 on first tool body 320 to generate a first elastic wave of acoustic energy at a first frequency $f_1$. Second source 315 is arranged in borehole 110 on second tool body 325 to generate a second elastic wave of acoustic energy at a second frequency $f_2$. First and second elastic waves produced by sources 305, 315 are arranged to intercept away from borehole 110 at various mixing zones 130. Receiver 145 is arranged within borehole 110 to receive a third wave that is produced in the mixing zones 130 by the three-wave mixing process discussed above, and further discussed below. Since the waves produced by sources 305, 315 are essentially non-directional, mixing between the waves occurs simultaneously in the entire area of mixing zones 130, that also extends out of the plane of the Figure, and receiver 145 tends to have directional characteristics. By way of a non-limiting example, a three component geophone array may be used for this purpose. The resultant signal is decomposed by processing into multiple arrival signals at a range of inclinations and azimuths and travel times. Given the locations of sources and the receivers, the travel times and directions of each decomposed directional arrival, there is sufficient information to apply the selection rules described below to determine a unique mixing zone where the third wave was generated. This unique mapping allows the construction of a three dimensional image from the properties of the received signal.

Figure 4:
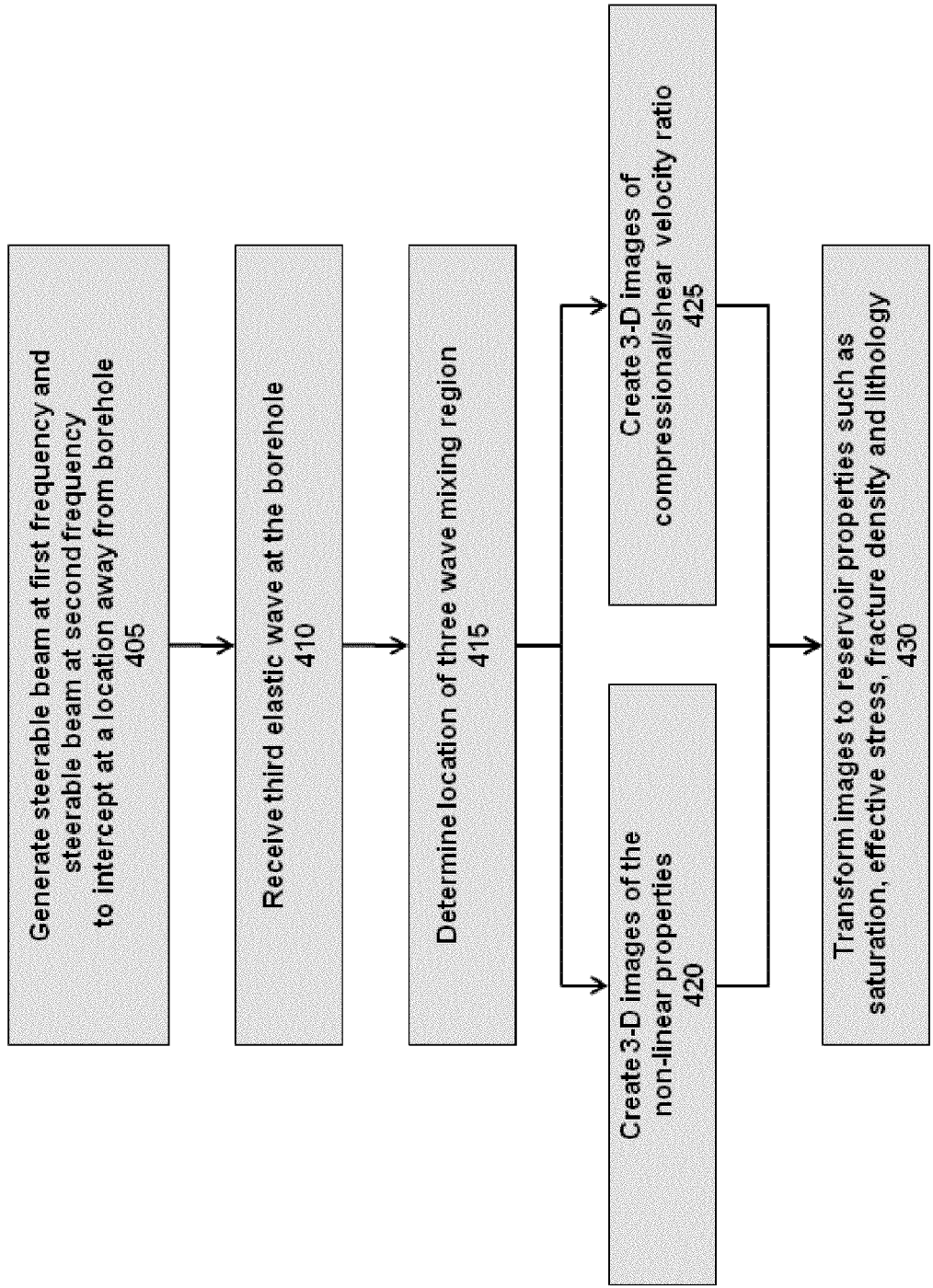
FIG. 4 shows a flow chart for creating three-dimensional images of non-linear properties in a region remote from a borehole in accordance with various aspects of the disclosure.

FIG. 4 shows a method for creating three-dimensional images of non-linear properties and the compressional to shear velocity ratio in a region remote from a borehole using a conveyed logging tool. The method begins at 405 where a first source is arranged in the borehole to generate a steerable beam elastic energy at a first frequency and a second source is arranged in the borehole to generate a steerable beam of elastic energy at a second frequency. The steerable beams at the first and second frequency are arranged to intercept at a location away from the borehole. As such, the second beam is generated at the same azimuth as the first beam, but at a different inclination relative to the longitudinal axis of the borehole. The method continues at 410 where a third elastic wave is received at the borehole by a sensor array. As discussed above, the third elastic wave is created by a three wave mixing process, with a frequency equal to a difference between the first and second frequencies and a direction of propagation towards the borehole. At 415, a three wave mixing location away from the borehole is determined from the arrangement of the first and second sources and properties of the third wave, by recourse to the selection rules discussed below. At 420, three-dimensional images are created of the non-linear properties using data recorded by repeating the generating of step 405, the receiving of step 410 and the determining of step 415 at a plurality of azimuths, inclinations and longitudinal locations within the borehole. In cases of compressional-shear interaction the received signals are analyzed in step 425 for the compressional/shear velocity (Vp/Vs) ratio. At 430, the non-linear properties are transformed to physical reservoir properties such as fluid saturation, effective stress, fracture density and mineralogy.

In some aspects of the present disclosure, the first and second sources may be beam or cylindrical or spherical wave sources, and the sensor array may be any combination of non-directional single component sensors and three component geophones. Alternative permutations of the component parts offer different degrees of redundancy in signal processing and imaging.

Experimental demonstrations of non-linear mixing of two acoustic waves in solid have been reported, for example by Rollins, Taylor and Todd (1964), Johnson et al. (1987) and Johnson and Shankland (1989), which are hereby incorporated by reference in their entirety. In the special case where a primary compressional (P) wave with a frequency $f_1$ and a primary shear (S) wave with a frequency $f_2$ cross each other, in a non-linear medium, a third P or S wave is generated with the frequency $f_1-f_2$. If the primary P and S waves are beams with wave vectors $k_1$ and $k_2$, respectively, and the non-linear formation property is uniform, the kinematics of wave interaction requires the resulting third wave to be a plane wave with wave vector $k_3$ that obeys the selection rule $k_1-k_2=k_3$. The selection rule imposes a very tight restriction on the permissible crossing angles for the primary waves and a specific propagation direction of the third wave. The general kinematic theory for non-linear mixing of two linear plane waves and the selection rules and amplitude responses have contributions from Jones and Kobett (1963), Rollins, Taylor et al. (1964) and later by Korneev, Nihei and Myer (1998), all of which are hereby incorporated by reference in their entirety, who also provide specific relationships between non-linear parameters of the mixing medium and the non-linear mixing signal strength. For example, Equation 53 and 54 of Korneev, Nihei and Myer show that the mixing strength of P and SV (vertically polarized shear) plane waves is proportional to a specific combination of non-linear parameters of the rocks.

The selection rules of Korneev, Nihei and Myer governing the nonlinear interaction of two elastic plane waves can be used as guidance for the interaction of two elastic beams. These plane wave selection rules dictate that the following six nonlinear interactions produce backscattered waves.

Table 1—Selection Rules Governing Non-Linear Interaction of Two Elastic Plane Waves. In this table, and elsewhere in this document, $f_1$ is greater than $f_2$.

| Selection Rules | $1^{st}$ beam or wave | $2^{nd}$ beam or wave | Resultant $3^{rd}$ beam or wave from $1^{st}$ + $2^{nd}$ |
|---|---|---|---|
| 1 | $P(f_1)$ | $SV(f_2)$ | $P(f_1 - f_2)$ |
| 2 | $P(f_1)$ | $SV(f_2)$ | $SV(f_1 - f_2)$ |
| 3 | $P(f_1)$ | $SH(f_2)$ | $SH(f_1 - f_2)$ |
| 4 | $P(f_1)$ | $SV(f_2)$ | $P(f_1 + f_2)$ |
| 5 | $SV(f_1)$ | $SV(f_2)$ | $P(f_1 + f_2)$ |
| 6 | $SH(f_1)$ | $SH(f_2)$ | $P(f_1 + f_2)$ |

Figure 5:
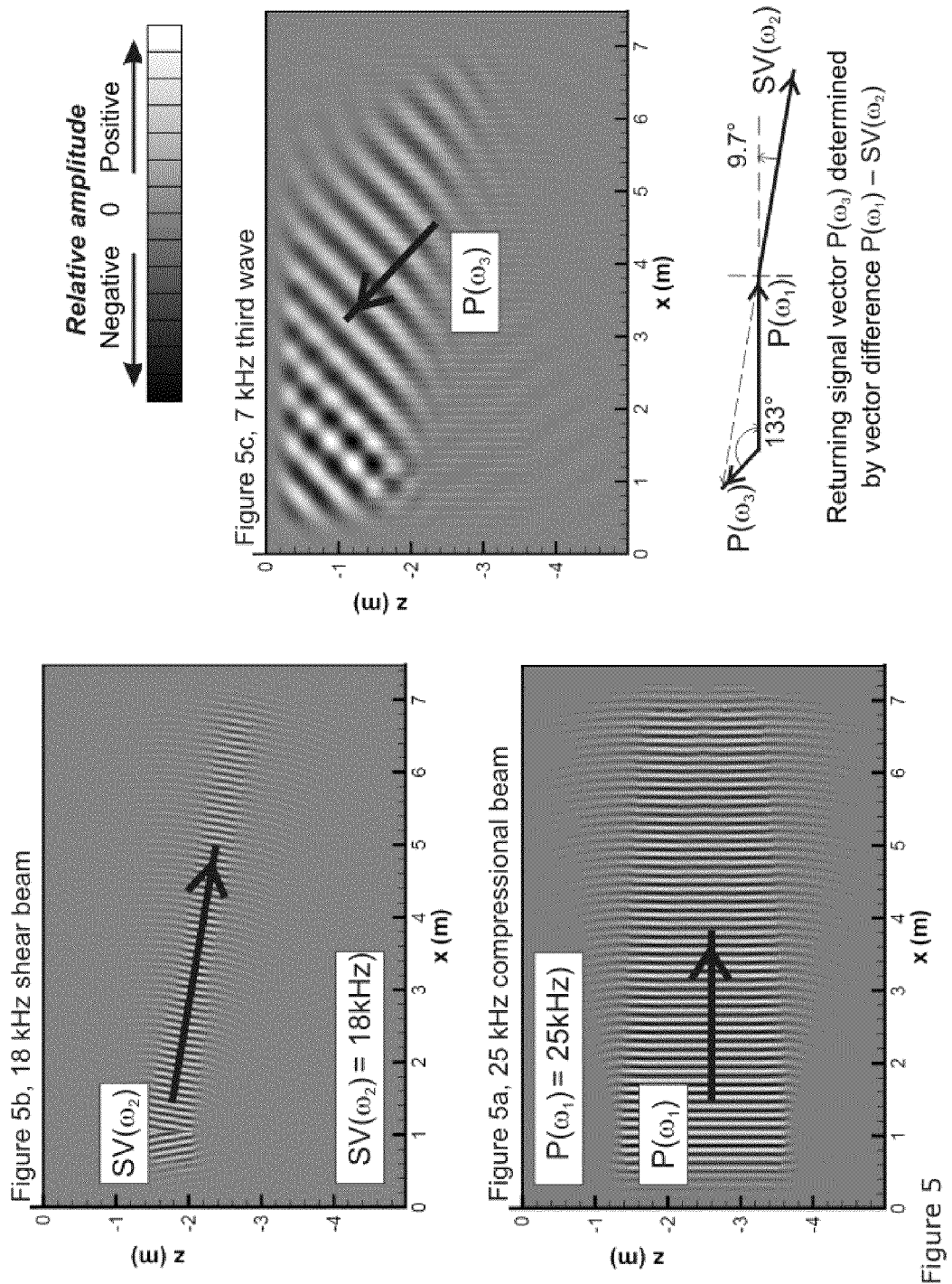
FIGS. 5a, 5b and 5c shows a numerical simulation of selection rule 1 for a beam-beam interaction of Table 1 when the two primary waves are beams.

FIGS. 5a, 5b and 5c shows a numerical simulation of selection rule 1 of Table 1 when the two primary waves are beams of a beam-beam interaction. A 25 kHz compressional beam, shown in FIG. 5a, and a 18 kHz shear beam, shown in FIG. 5b, mix to form a third beam, shown in FIG. 5c, with frequency 7 kHz=25 kHz–18 kHz. In this example, in accordance with the plane wave predictions of Korneev, Nihei and Myer, a third back propagating P beam with frequency $(f_1-f_2)$ at an angle of 133° to the $P(f_1)$ wave is generated by nonlinear mixing in the region where the $P(f_1)$ and $SV(f_2)$ beams overlap.

The kinematics of non-linear interactions of beams results in the generation of specific combinations of wave vectors and frequencies. The third wave returns at a specific travel time, and with specific frequencies $f_3$ and wave vectors $k_3$ such as $f_3=f_1-f_2$ and $k_3=k_1-k_2$. For a combination of $f_1, f_2, k_2$ and $k_3$, there is a well-defined propagation wave vector $k_3$ of the third wave in the same plane, defined by $k_1$ and $k_2$. There is a direct correspondence between the signal detected at a particular receiver position and the location where the non-linear mixing of the two primary waves $k_1$ and $k_2$ takes place. The signal strength of the receiver would be proportional to the strength of the non-linearity of the rocks in the mixing zone, among other factors, and reach a maximum for a receiver lying on vector $k_3$. Therefore, the signal strength at the receivers can be geometrically mapped onto the non-linearity of the rocks along the beam trajectory as indicated by FIG. 1.

The geometrical theory of wave propagation indicates that the beam generated in each interaction zone would arrive at the borehole at a specific receiver defined by the geometry of the three wave vectors $k_1, k_2$ and $k_3$, after a specific time delay. The strength of the returning signal at a specific location in the borehole at a particular time is dependent on the degree of non-linearity of the interaction location, and hence a time image of the relative strength of the non-linear properties of the rocks along the beam can be constructed. The amplitude magnitude of a returned signal at the receivers is itself indicative of certain petrophysical properties of the mixing zone. If the beam and plane wave are scanned in azimuth and inclination while preserving the necessary convergence angle, a localized circumferential and radial 3D image of non-linear properties of rocks surrounding the borehole can be obtained. By moving the entire assembly up and down the borehole, repeated 3D images of non-linear properties of rocks surrounding the borehole are obtained. By making weighted stacks of these repeated images, a final image of non-linear properties of rocks surrounding the entire borehole can be constructed through subsequent computer processing. In addition, if the sources and the receivers are part of three separate tool bodies, one or two can be moved while the third one is fixed (for example, the sources are fixed while the receiver tool body is moved up and down). Alternatively, several descents into the well may be made with different spacing between the tool bodies.

For non-linear mixing between an elastic beam and a broader beam (quasi plane wave), the selection rule is relaxed. Third waves of frequency $f_1-f_2$, centered around the wave vector $k_3=k_1-k_2$, are generated continuously along the primary beam if the beam width is about ten wavelengths of the third wave. The resulting signal strength for $f_3=f_1-f_2$ is a function of the average non-linear properties of the mixing region, the average ratio of velocity of $f_1$ propagation and average velocity for $f_2$ propagation (noting that $f_1$ and $f_2$ may be compressional or shear), the volume of the mixing zone and the geometry of the mixing. This function can be computed for various mixing modes. For example, the signal strength for a particular important mixing mode such as compressional wave P for $f_1$ and SV for $f_2$ is given by $$U = 2\pi^2 \beta_{PS_vP} A_1 B_2 \frac{f_1 f_2 (f_1 - f_2)}{V_P^2 V_s} \frac{V_{PS_vP}}{r} F_{PS_vP} \Delta_{PS_vP} \tag{1}$$

where U is the displacement amplitude of the third wave received at the borehole, $A_1$ is the longitudinal polarization of the compressional wave and $B_2$ is the transverse polarization of the shear wave. β is a function of the A, B and C parameters of Landau and Lifschitz representing the non-linearity of the rocks in the mixing zone. v is the volume of the mixing zone, r is the distance from mixing zone to the receiver. F is the geometric form factor of order 1 which is dependent on the geometry of the incident beams and can be numerically computed from the Korneev, Nihei, Myers theory for the particular geometry. A is a selection rule form factor which is a numerically computable function of the wave vectors $k_1$, $k_2$ and $k_3$ and is only significant if the interaction geometry honors the selection rules. The subscript $PS_vP$ in the formula refers to compressional-shear interaction generating a compressional wave.

Figure 6:
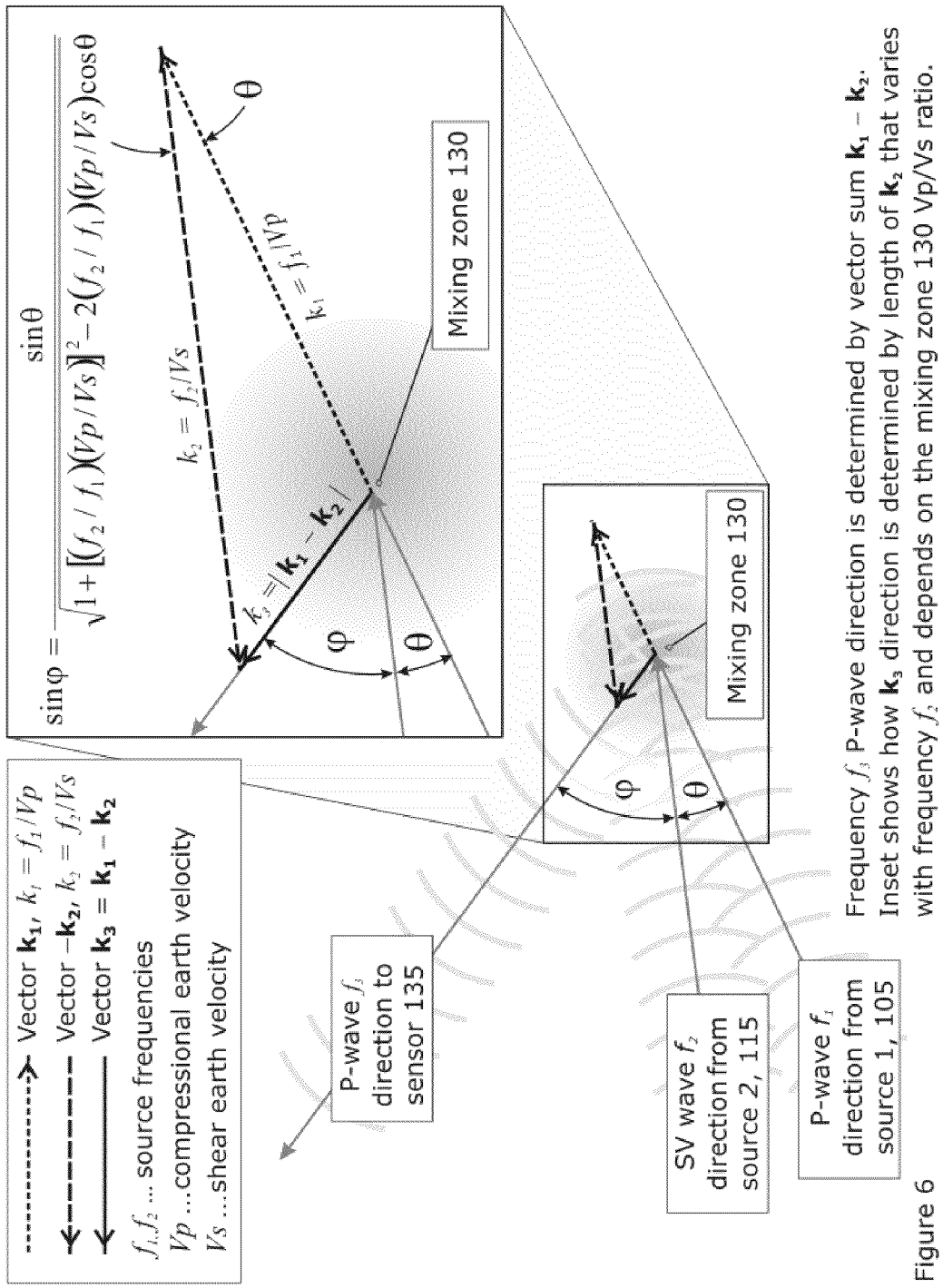
FIG. 6 illustrates the geometry of the generation of the difference frequency third wave by non-linear mixing of two primary acoustic waves as governed by the non-linear mixing selection rule.

In accordance with certain aspects of this disclosure, an image of the compressional to shear velocity ratio may be constructed as follows. When one of the sources generates a compressional wave (P-wave) with frequency $f_1$ and the other source generates an SV-wave with frequency $f_2$ and both waves are steered towards a specific mixing volume, the propagation direction of the third compressional wave (P-wave) with difference frequency $f_3=f_1-f_2$ is controlled by the average in situ Vp/Vs ratio of the rock in the mixing zone as governed by the selection rules as shown in FIG. 6. From the measurements of the signal in the three component receiver array 145 on FIG. 2 or FIG. 3, the direction of this third wave can be determined and thereby, the in situ Vp/Vs of the mixing zone can be computed. If the beam and plane wave are scanned in azimuth and inclination while preserving the necessary convergence angle, a localized circumferential and radial 3D image of in situ Vp/Vs ratio of rocks surrounding the borehole can be obtained. By moving the entire assembly up and down the borehole, repeated 3D images of in situ Vp/Vs of rocks surrounding the borehole may be obtained. By making weighted stack of these repeated images, a final image of in situ Vp/Vs of rocks surrounding the entire borehole can be constructed through subsequent computer processing. Alternatively, several descents into the well may be made with different fixed spacing between the tool bodies.

In some aspects of this disclosure, an alternative determination of Vp/Vs ratio is achieved through scanning the ratio of the frequencies $f_1$ to $f_2$ of the primary beams. FIG. 6 illustrates the geometry of the interaction of two beams such as those generated in the configuration of FIG. 1, that may be analyzed using the vector mathematics and trigonometry described above. The lengths $k_1$ and $k_2$ of vectors $k_1$ and $k_2$ are defined by the ratio of their corresponding frequencies and velocities. As shown in FIG. 6, the returning angle $\gamma$ is a function of $f_1/f_2$, Vp/Vs ratio and the intersection angle $\theta$ of the two primary beams. In addition, the physical selection rules only permit the generation of a third wave at specific combinations of $f_1/f_2$, Vp/Vs ratio and angle of interception 0, such as the example illustrated on FIG. 5.

Using the symbol r for the Vp/Vs ratio and the terms defined on FIG. 6, the magnitude $k_3$ of vector $k_3$ is given by the vector sum of $k_1$ and $-k_2$, that is $k_3=|k_1-k_2|=$ $$k_3 = |k_1 - k_2| = \frac{f_1 - f_2}{V_p}$$

and also by the cosine rule that states $k_3^2=k_1^2-k_2^2-2k_1k_2\cos\theta$. Combining the two equations, and substituting $f_1/Vp$ for $k_1$ and $f_2/Vs$ for $k_2$, leads to a statement of the geometric conditions imposed by the selection rules. The quadratic equation $$\frac{f_2}{f_1}r^2 - 2\cos\theta r - \frac{f_2}{f_1} + 2 = 0$$

may be solved for r, the VpVs ratio of the mixing zone. This leads to a non-limiting alternative method for measuring in situ Vp/Vs ratio of a particular mixing region by the following sequence: a) record a standard sonic waveform log to determine Vp and Vs near the wellbore to acquire data to estimate the phase differences between adjacent elements in a phased source array to steer the beams at the approximate convergence angle for the geometry of the planned measurement; b) steer the P and SV sources to converge at a controlled angle $\theta$ and mix at a particular region in space surrounding the borehole; c) vary $f_2$ while fixing $f_1$ and measure the amplitude of the received signal at the difference frequency $f_1-f_2$ at the sensors in the borehole; d) identify the frequency at which the signal each receiver in the array reaches a maximum amplitude strength; and e) determine angles $\theta$ and $\phi$ from the geometry of the sources and receivers. By sweeping the beams in inclination, rotating in azimuth, and moving the entire assembly up and down the borehole and repeating the above procedure, the VpVs ratio of a 3D volume around the borehole is interrogated and thereby 3D images of in situ Vp/Vs ratio of rocks surrounding the borehole may be obtained.

The methods described above offer an advantageous property in that the frequency difference $f_1-f_2$ is very specific, allowing for spectral analysis to enhance the signal to noise ratio of the measurements. Moreover, if both frequencies $f_1$ and $f_2$ are simultaneously chirped proportionally, the resulting difference frequency signal $f_1-f_2$ would also be a well defined chirped signal. The time-varying code may include one or more of a variation in amplitude, a variation in frequency, and/or a variation in phase of the first, the second, or both the first and the second beams or waves. The third difference wave can be broad band if one of the primary frequencies is swept through a range of frequencies while their frequency ratio is fixed. Thus, the resulting third beam $f_2-f_1$ will be swept across a wide frequency range, while preserving the same direction. This allows for improvement in signal to noise by standard auto-correlation of the chirped or coded signal.

Since the wave vector $k_3=k_1-k_2$ is well defined, the signal to noise discrimination of the recorded third wave from receivers 135 can be enhanced further by employing three-component receivers in the borehole. The signals from the three components can be tuned to specific directivity by a technique, such as, hodogram analysis.

In some aspects of the present disclosure, the signal to noise ratio can be improved by repeating the above steps with an inverse polarity (180 degrees out of phase) and adding the results together. The returning difference frequency signal will add coherently as its amplitude is proportional to the product of the amplitudes of the two primary waves and therefore will not reverse polarity when the polarity of the primary source is reversed, while any linear noises generated by the primary waves in the system will reverse polarity and cancel upon addition.

Alternative methods can be devised with various non-exclusive combinations of beams and waves. By way of a non-limiting example, a method to generate images by computer processing of acoustic and seismic signals includes the follow steps. First, perform spectral analysis of the frequency content of the recorded third wave and applicable selection rules of the difference frequency signal in order to isolate the third wave signal generated by the non-linear mixing process. In the case that the sensors include three component geophones, determine the direction of the third wave impinging on the borehole using orientation techniques. The method continues by analyzing the amplitude of the recorded third wave as a function of frequency ratios of the primary mixing waves and determining the mixing location where the third wave signals originated, from the selection rules of non-collinear mixing in non-linear media, the wavenumbers of the first and second beams and the third wave and the locations of the two beam sources and the sensor array. The method continues by constructing seismograms determined by cross-correlation of the received signals with chirped transmitter signals for each source-receiver combination. The method continues by performing three dimensional time or depth imaging to the entire data set, in order to obtain three dimensional images of the non-linear properties of the formation surrounding a borehole in either or both of time and distance. The methods for generating images from seismograms are known, for example, Hill et al., which is hereby incorporated by reference, have provided the general methodology for the special case of imaging from beams.

Another non-limiting alternative imaging method is illustrated on FIG. 7, which shows the case of interactions of a narrow 705 and a broad (wide) beam 710. Given a smooth background model of Vp and Vs of the investigated volume, application of the selection rules enables the geometric mapping of the energy detected at a receiver location 735 on to mixing zones 730 along the narrow beam. A time image of the non-linear property can thus be constructed along the narrow beam. By rotating in azimuth and moving the assembly along the borehole, a three dimensional time image can be constructed of a volume centered on the borehole. Successive repetition of the measurement at different beam inclinations, and altering the $f_2/f_1$ frequency ratio $\alpha$ yields a series of three dimensional time images. This redundancy in imaging permits the further refinement of the smooth background model and a three dimensional spatial image.

Non-linear parameters of rocks have been found to be related to a number of important hydrocarbon reservoir parameters, such as variations with gas, oil and water saturation, effective stress, fracture density and mineralogical content. For example, see Ostrovsky and Johnson 2001, which is hereby incorporated by reference. In certain aspects of this disclosure, the 3D images of non-linear properties constructed by this method are transformed to provide quantitative information on the distribution of these properties around the borehole at the time of recording. In addition, sequential repetitions of this method are used to detect changes in reservoir properties over time for reservoir monitoring purposes.

The recordings of received waveforms are processed to generate an image of the non-linear characteristics of the formation. The directivity of the beam and the time of flight may fix the locations where scattered waves are generated, distinguishing this device from normal sonic imaging techniques using conventional non-directional monopole and dipole sources.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. As a further example, it is to be understood that the present invention contemplates that, to the extent possible, one or more features of any embodiment can be combined with one or more features of any other embodiment.

What is claimed is:

1. An apparatus for estimating Vp/Vs ratio of the rock formations remote from a borehole using a conveyed logging tool, the apparatus comprising:
   a first source arranged in the borehole and configured to generate elastic energy at a first frequency;
   a second source arranged in the borehole and configured to generate elastic energy at a second frequency, wherein the energy at the first frequency and at the second frequency intersect at a location away from the borehole;
   a sensor array configured to receive a third elastic wave, the third elastic wave being created by a non-linear mixing process from the elastic energy at the first frequency and the elastic energy at the second frequency in a non-linear mixing zone, the third elastic wave, having a frequency equal to a difference between the first and the second frequencies and a direction of propagation toward the borehole; and
   a processor arranged to identify a location of the mixing zone based on the arrangement of the first and the second sources, the direction of the third wave and selection rules governing non-collinear mixing in acoustically non-linear media, and to estimate Vp/Vs ratio based, in part, on the received third elastic wave and the arrangement of the first and second sources.

2. The apparatus according to claim 1, wherein the processor is further arranged to create the three-dimensional images based, in part, on properties of the received third wave and the arrangement of the first and second sources.

3. The apparatus according to claim 1, further comprising: a device configured to transmit data up-hole through a wireline cable for a wireline tool; and a subsequent processor arranged in the borehole to control recordings of the third elastic wave.

4. The apparatus according to claim 1, wherein the first source and the second source are configured to generate elastic energy selected from the group consisting of: steerable beams, waves with limited directionality, and combinations thereof.

5. The apparatus according to claim 1, wherein the first source and the second source comprise an array of sources.

6. The apparatus according to claim 1, wherein the first source, the second source, and the sensor array are arranged either on a common tool body or on separate tool bodies.

7. The apparatus according to claim 6, wherein the first source, the second source, and the sensor array are arranged on separate tool bodies, and the separate tool bodies can be moved independently along a longitudinal axis of the borehole.

8. The apparatus according to claim 1, wherein the sensor array comprises either one or more hydrophones mounted on a tool body, or one or more three-component geophones, or accelerometers, clamped to the borehole wall, or both.

9. The apparatus according to claim 1, wherein an azimuth and an inclination relative to a longitudinal axis of the borehole of the directions of propagation of the waves generated by one or both of the sources can be controlled.

10. The apparatus according to claim 1, wherein the sensor array and the sources are arranged to be moved together or independently along the longitudinal axis of the borehole.

11. The apparatus according to claim 1, wherein a plurality of radial scans is obtained by altering a spacing between the sources and the sensor array.

12. The apparatus according to claim 1, wherein a plurality of radial scans is obtained by altering a spacing between the sources.

13. The apparatus according to claim 1, wherein, at a given borehole location, the second source is configured to be controlled at a range of frequencies f2 of the form $f2=\alpha f1$, sweeping the values of $\alpha$.

14. The apparatus according to claim 1, wherein either or both of the first and the second waves are either chirped or coded or both chirped and coded.

15. The apparatus according to claim 14, wherein either the first or the second wave is modulated, and the modulation is selected from the group consisting of: amplitude, phase, period and any combination thereof.

16. The apparatus according to claim 1, wherein at each position related to a single azimuth, inclination and longitudinal location, control of the sources is repeated, the second time with both signals at opposite polarity.

17. The apparatus according to claim 1, wherein the processor is further configured and arranged to identify a frequency at which the received signal reaches a maximum amplitude strength for each receiver in the sensor array and to measure in situ Vp/Vs ratio for the particular mixing region away from the borehole by determining the angle of intersection of the beams of the first frequency and the beams at the second frequency and a returning angle of the third elastic wave from the geometry of the first and the second sources, the sensor array and selection rules governing non-linear and non-collinear mixing properties.

18. The apparatus according to claim 1, wherein the elastic energy at the first frequency is a compressional elastic energy and the elastic energy at the second frequency is a shear elastic energy.

* * * * *